Aug. 21, 1934.　　　　H. A. WHEELER　　　　1,971,242
SOLAR WATER HEATER
Original Filed May 8, 1929
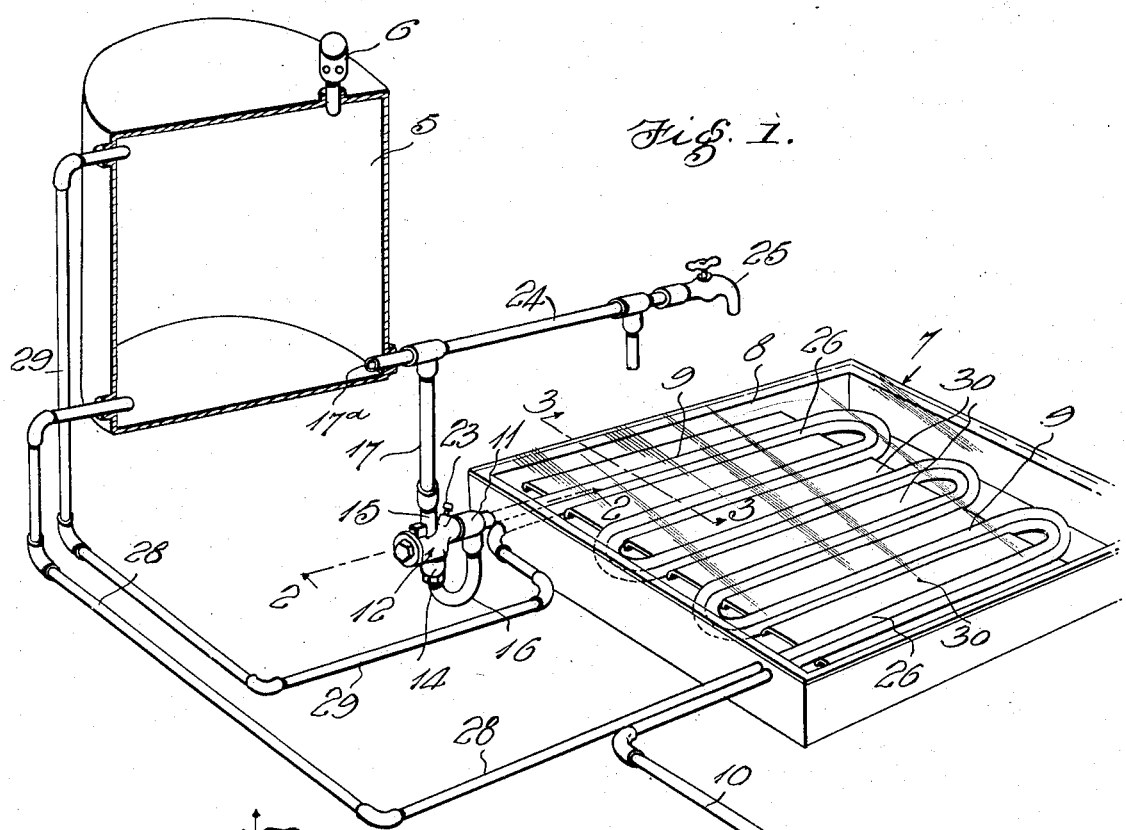
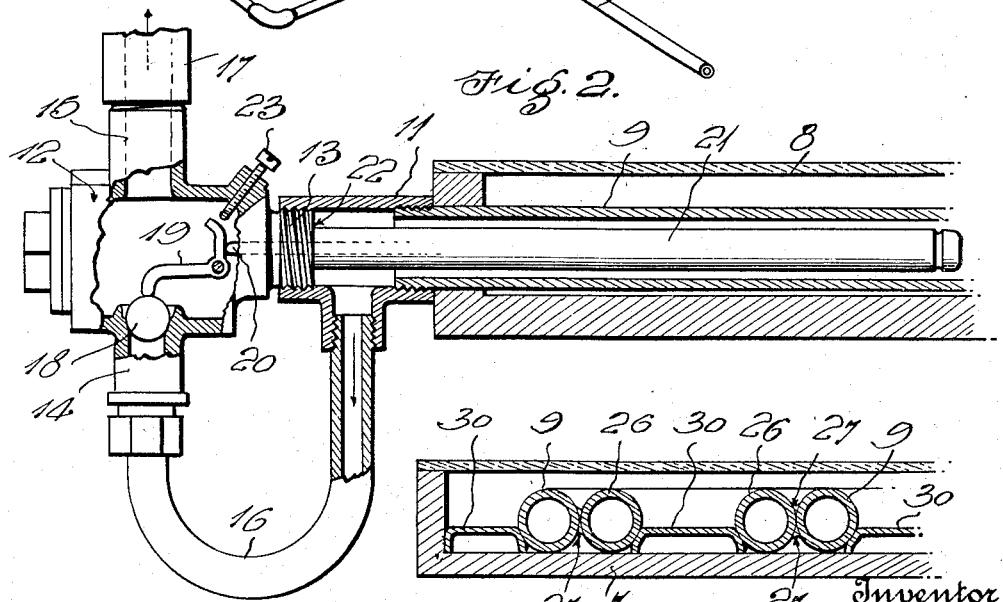
Witness
H. Woodard
Inventor
Henry A. Wheeler;
By H. B. Wilson & Co.
Attorneys Patented Aug. 21, 1934

1,971,242

UNITED STATES PATENT OFFICE 1,971,242

SOLAR WATER HEATER

Henry A. Wheeler, Miami, Fla., assignor, by direct and mesne assignments, to Universal Twin Coil Solar Heater Company, a corporation Application May 8, 1929, Serial No. 361,477
Renewed July 8, 1933

5 Claims. (Cl. 126—271)

The invention relates to a solar water heater of a type in which water from a supply line passes through a sun-heated coil and is allowed to discharge from said coil into a tank only when it has become heated to a predetermined temperature, a thermostatic valve being provided for controlling communication between the coil and the tank. In solar heaters of this type, the coil in reality attains a higher temperature than is essential. The water in the tank however, is not at a uniform temperature throughout but is relatively cool at the lower end and much hotter at the upper end. It is the principal object of my invention to make use of the excess heat of the primary coil to assist in highly heating a second coil which is connected at its ends with the upper and lower portions of the water tank, for the purpose of producing effective circulation in this tank so that the water therein will be maintained at a substantially uniform temperature and any time a spigot is opened, hot water will be discharged from said tank. Then too, the additional coil serves also as further heating means for the water.

Another object is to provide a generally improved system in which opening of the hot water draw-off line while the heater is "putting out" hot water, will effect pressure discharge of such water, but will cause gravitation of water from the storage tank if hot water is not flowing from the heater at the time of opening said draw-off line.

A shallow glass-covered casing is provided for the first mentioned coil, and it is a further object of the invention to utilize this same casing for the second coil and to provide heat absorbing fins in said casing unitarily connected with both coils to provide a single mass of metal to be heated by the sun. By so doing, more efficiency is obtained and the expense of an additional sun heated casing for the second coil, is obviated.

A still further object of the invention is to provide a new and improved relation of parts whereby a thermostatic valve of a type now manufactured, may readily be used for controlling the discharge of hot water from the first mentioned coil, so that a specially constructed valve is not necessary for this purpose.

With the foregoing, in view, the invention resides in the novel subject matter hereinafter described and claimed, description being accomplished by reference to the accompanying drawing.

Fig. 1 is a perspective view partly in section showing a solar heater improved in accordance with my invention.

Fig. 2 is an enlarged vertical sectional view substantially on line 2—2 of Fig. 1.

Fig. 3 is a similar view on line 3—3 of Fig. 1.

In the drawing above briefly described, the numeral 5 denotes a water storage tank having an automatic valve 6 at its upper end which acts to vent air from the tank while it is filling with water and upon discharge of water, serves to admit air. At any desired location, in close proximity to or distantly spaced from the tank 5, as circumstances may dictate, is a shallow casing 7 having a glass top 8. In this casing is a water-heating coil 9 whose inlet end is connected to a cold water supply line 10 leading from a domestic or city water system. The outlet end of the coil 9 is threaded into or otherwise connected with one end of the head of a T 11. A valve body 12 is connected with the other end of the T-head, being preferably provided with an integral plug 13 threaded into the same. The body 12 is provided with a water inlet 14 and with a water outlet 15, the former being connected by a pipe 16 with the shank of the T 11. The outlet 15 is connected by a hot water conducting line 17—17ª with the lower end of the tank 5. Communication between the inlet 14 and the outlet 15, is controlled by a ball valve 18 for which an actuator 19 is provided. This actuator is directly controlled by a rod 20 disposed within a thermostatic tube 21 and secured to the end of the tube remote from the body 12. Tube 21 is fluid-tightly secured at 22 to the plug 13 and it extends through the head of the T 11 and into the outlet end portion of the coil 9. As long as the water in this coil is below a predetermined temperature, tube 21 remains contracted and the rod 20 holds the actuator 19 in such position that it holds the valve 18 closed. Upon predetermined rise of temperature of the water in the coil 9 however, the tube 21 expands causing movement of rod 20 to release the actuator 19. Thus, the relatively hot water below valve 18, rises and unseats said valve, passing on to the tank 5. The extent to which valve 18 opens may be controlled by a screw 23 readily adjustable from the exterior of the body 12 and acting as a stop for limiting the valve-opening movement of the actuator 19. When for any reason the water in the coil 9 again drops in temperature below a predetermined degree, tube 21 contracts, rod 20 moves actuator 19, and this actuator again closes the valve 18 so that no relatively cool water may discharge into the tank 5.

A hot water draw-off line 24 is provided, said line being common to both the coil 9 and the tank 5 and leading to any desired number of spigots or the like such as 25. In the present showing this discharge line is connected with the piping 17a, between the thermostatic valve 12 and the tank 5. While this is preferable, it is not essential as the draw-off line 24 may lead from a lower end portion of the tank 5 spaced from the piping 17a.

A second water-heating coil 26 is disposed in the casing 7 in direct contact with the coil 9 to absorb excess heat from the latter, and the two coils 9—26 are by preference unitarily connected with each other as at 27, by means of brazing, welding or the like. The inlet end of coil 26 is connected by piping 28 with the lower portion of the tank 5, and the discharge end of said coil 26 is similarly connected by piping 29 with the upper portion of said tank. Thus, as the water in coil 26 becomes heated, it circulates and effects thorough circulation of the water in the tank 5, thereby maintaining the water in this tank at substantially a uniform temperature throughout its depth. Moreover, the coil 26 serves as additional heating means for the water in the tank 5.

Heat-absorbing fins 30 are disposed in the casing 7 and are welded or otherwise secured to the reaches of the coils. The two coils 9—26 and the fins 30 being thus connected, form a single unitary mass of metal which is highly heated by the sun to cause high-efficiency operation of the heater.

Discharge of water from the coil 9, being controlled by the thermostatic valve, insures that the water in said coil and the coil itself shall rise to an unusually high temperature before discharge of water shall take place through the piping 17—17a into the tank 5. In fact, the degree of heat attained is greater than necessary and I utilize the excess heat for heating the additional coil 26 to force rapid circulation in the tank 5 for the purpose set forth.

In systems of this character, it is the practice to cover the tank 5 with heat-insulating material but this is not shown in the drawing. This heat insulation on tank 5 conserves the temperature of the water therein during the night or at other times when the sun is not shining and heating the water in the coils. In most previous solar systems, the tank 5 is full of water at all times since when some hot water is withdrawn, other water enters and hence if in the evening a certain amount of water is drawn from the tank 5, the water that enters to take its place is cool and hence the temperature of the water as a whole in tank 5 would be low until the next day when the sun shines on the coil. This condition is overcome by the present invention since if in the evening a part of the water is drawn off from the tank 5, the thermostatic valve prevents the tank from refilling and hence the remaining hot water in the tank is retained for use early the next morning and the tank does not refill until the sun has sufficiently heated the coil 9 to open the thermostatically-controlled valve 18. By the use of this invention, I am enabled to get a greater quantity of hot water and have it at hand at all times, than can be obtained with a much larger outfit constructed in accordance with prior solar systems.

Attention is invited to the fact that upon opening of a spigot 25 of the draw-off line 24 while the ball 18 is unseated and the coil 9 discharging hot water, this hot water will be directly discharged under the same pressure as that at which the cold water enters said coil 9. Opening of a spigot 25, however, when ball 18 is seated, causes gravity discharge of stored hot water from the tank 5, entrance of cold water to said tank being then prohibited by said ball 18. As the water lowers in the tank 5, the valve 6 admits air to said tank, and later, when the coil 9 again delivers more hot water to the tank 5, said valve opens to permit the escape of the air, but closes upon arrival of the water at said valve. This valve 6 may be of any known type, usually float actuated, for accomplishing the desired end.

As excellent results are obtainable from the general subject matter herein disclosed, it is preferably followed. However, within the scope of the invention as claimed, variations may be made.

I claim:—

1. A solar heater comprising a tank, a sun-heated coil having its inlet end connected with a water supply line, water conducting means from the outlet end of said coil to said tank embodying a thermostatic valve which opens only when the coil-contained water has reached a predetermined temperature, a discharge pipe from said tank, a sun-heated water-circulating coil in contact substantially throughout its length with the first named coil to absorb excess heat from the latter, and connecting means between the ends of said water-circulating coil and the upper and lower ends of said tank respectively.

2. A structure as specified in claim 1; in combination with a shallow glass-top casing containing both coils, and heat absorbing fins in said casing, said coils and fins being unitarily united and jointly forming a single mass of metal to be heated by the sun.

3. In a solar heater, a sun-heated water coil, a T having one end of its head connected with the outlet end of said coil, a valve body having a water inlet and a water outlet and provided with coupling means engaged with the other end of the T-head, thermostatic means fluid-tightly connected with said body and extending through said T-head into said coil, a valve in said body for allowing or preventing flow from said inlet to said outlet, an actuator for said valve controlled by said thermostatic means and adapted for movement to valve-open position upon predetermined heating of said thermostatic means, and a water conducting pipe connected with the shank of said T and with said water inlet.

4. In a solar water heater, a tank, a water supply pipe leading to said tank and embodying a sun-heated water heating coil and a thermostatic valve in said pipe between said coil and said tank, and a free-circulation water heating coil in contact with the first named coil, both ends of said free-circulation coil being in communication with said tank.

5. In a solar water heating system, a normally closed hot water storage tank provided with a valve operable to admit air upon lowering of water in the tank, a solar heater, a cold water supply pipe leading to said heater for conducting water under pressure to the latter, a hot water conducting pipe leading from said heater to the lower end of said tank, a thermostatic valve in said hot water conducting pipe closable when said heater discharges only relatively cool water and openable when the heater-contained water becomes hot, and a hot water draw-off pipe common to both said heater and said tank, said hot water draw-off pipe having a faucet, being connected with said hot water conducting pipe between said thermostatic valve and said tank, and extending downwardly to allow water from said tank to discharge by gravity; whereby when said heater is discharging hot water and said thermostatic valve is open, opening of said faucet of said hot water draw-off pipe will cause the latter to directly conduct hot water from said heater, and opening of said faucet when said thermostatic valve is closed will cause gravity-discharge of stored hot water from said tank through said hot water draw-off pipe.

HENRY A. WHEELER.